UNITED STATES PATENT OFFICE.

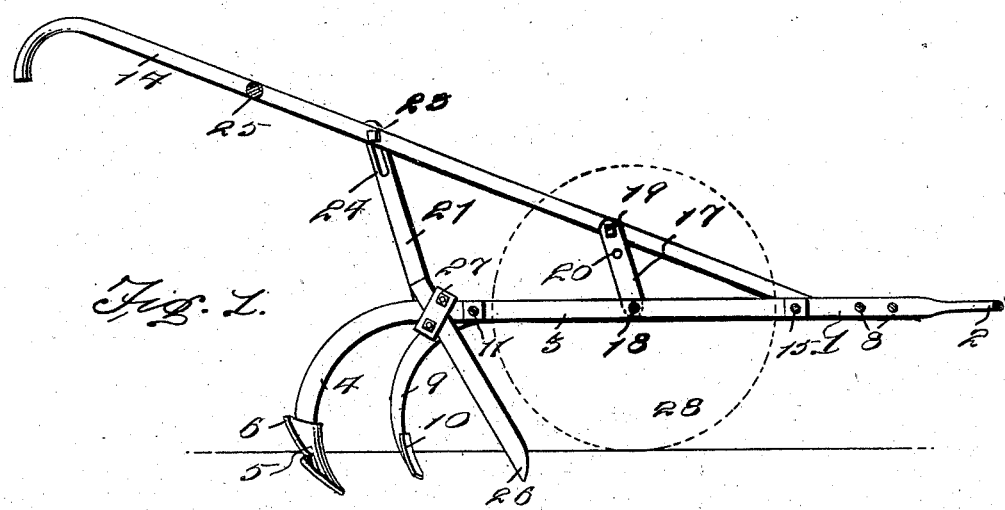

MICAJAH A. PIPER, OF LAGAN, LOUISIANA.

MIDDLE CULTIVATOR.

SPECIFICATION forming part of Letters Patent No. 720,066, dated February 10, 1903.

Application filed June 27, 1902. Serial No. 113,448. (No model.)

*To all whom it may concern:*

Be it known that I, MICAJAH A. PIPER, a citizen of the United States, residing at Lagan, in the parish of St. James and State of Louisiana, have invented a new and useful Middle Cultivator, of which the following is a specification.

My invention is an improved middle cultivator for cultivating listed corn and other crops, and is especially adapted for stirring the soil and breaking down the ridges between the rows; and it consists in the peculiar construction and combination of devices hereinafter fully set forth and claimed.

In the accompanying drawings, Figure 1 is a vertical longitudinal central sectional view of a middle cultivator embodying my improvements. Fig. 2 is a top plan view of the same. Fig. 3 is a detail elevation of a revolving colter adapted for use in connection therewith.

In the embodiment of my invention I employ a center beam 1, which comprises a bar of iron or steel bent at its center and doubled to form a draft-eye 2 at the front end of the beam, the rearwardly-extending arms 3 of the bar or beam being spaced apart and disposed parallel with each other and their rear ends being downturned to form a standard 4, to which may be secured a plow or shovel 5, having laterally-extending wings 6 projecting from opposite sides thereof. The said plow is adapted for use in breaking down the ridges between the rows.

On opposite sides of the center beam are rearwardly-extending side beams 7, which have their front ends secured thereto by bolts 8. The rear ends of the side beams are downturned to form standards 9, adapted for the attachment of suitable cultivator shovels or points 10, which run between the ridges or middles and the rows. A transversely-disposed brace-rod 11 extends through the center beam and side beams near the rear ends thereof and connects the said beams together, and on the said brace-bar are sectional space blocks or sleeves 12, by which the beams 7 may be disposed and maintained at any desired angle with reference to the center beam, clamping-nuts 13 being screwed on the ends of the brace-rod and bearing against the outer sides of the side beams.

A pair of handle-bars 14 have their front ends secured to the center beam, on opposite sides thereof and at a suitable distance from the front end thereof, by a bolt 15. On the said bolts between the arms 3 of the center beam is a space-block 16. A pair of braces 17 have their lower ends secured to the center beam by a bolt 18, which extends through the latter, and have their upper portions adjustably secured to the handles by bolts 19, the said braces having suitable adjusting-openings 20 for said bolts. Braces 21 have their lower ends secured to the side beams, near the rear ends thereof, by bolts 22 and have their upper portions secured to the handles by bolts 23, the latter extending through adjusting-slots 24, with which the said braces are provided. The said handles are connected together by a cross-bar or rung 25. It will be observed by reference to the drawings that the handle-braces 17 21 are respectively in front and rear of the brace-rod 11, which connects the side and center beams together.

The center beam also carries a colter, which is attached thereto and is adapted to run in advance of the plow 5. The colter may be either a straight blade 26, as shown in Figs. 1 and 2, secured to one side of the center beam by a clip-bolt 27, or it may be a revoluble disk 28, as indicated in dotted lines in Fig. 1 and shown also in Fig. 3, disposed between the arms of the center beam and journaled on the bolt 18, which secures the lower ends of the handle-braces 17 to said center beam.

In the operation of my improved middle cultivator the colter runs in the soil in advance of the plow or shovel 5, carried by the center beam, and prevents the cultivator from moving laterally.

Having thus described my invention, I claim—

1. In a cultivator, a beam comprising a bar bent and doubled to form a draft-eye at the front end of the beam, the rearwardly-extending arms of the bar being spaced apart and their rear ends being downturned to form a standard, in combination with a plow attached to the standard, handles, a securing-bolt extending through their front ends and through the beam, and a space-block on said bolt, between the arms of the beam, substantially as described.

2. In a cultivator, a center beam carrying a draft-eye at one end and downturned at the other end to form a plow-standard, rearwardly-diverging side beams having their rear ends downturned to form plow-standards and having their front ends secured to the center beam at opposite sides thereof, handles having their front ends secured to the center beam in rear of the front ends of the side beams, front braces connecting the handles with the center beam at an intermediate point thereof, rear braces connecting the handles with the side beams near their rear ends, and a transverse brace connecting the center and side beams at a point between the front and rear braces.

3. In a cultivator, a center beam carrying a plow at one end and a draft-eye at the other end, rearwardly-diverging side beams carrying plows and having their front ends secured to the front portion of the center beam on opposite sides thereof, handles connected to said beams, a brace-rod extending through the center and side beams near the rear thereof, and sectional space-sleeves disposed on said rod between said beams for maintaining said side beams at any desired angle in relation to said center beam.

In testimony that I claim the foregoing as my own I have hereto affixed my signature in the presence of two witnesses.

MICAJAH A. PIPER.

Witnesses:
V. AGAISSE,
T. TRÉGRE.